US007553904B2

(12) United States Patent
Lichtenhan et al.

(10) Patent No.: US 7,553,904 B2
(45) Date of Patent: Jun. 30, 2009

(54) HIGH USE TEMPERATURE NANOCOMPOSITE RESINS

(75) Inventors: Joseph D. Lichtenhan, Petal, MS (US); Qibo Liu, Irvine, CA (US); Yan-Jyh Lee, Novi, MI (US); Xuan Fu, Purvis, MS (US); Sukhendu Hait, Hattiesburg, MS (US); Joseph J. Schwab, Huntington Beach, CA (US); Rusty L. Blanski, Lancaster, CA (US); Patrick N. Ruth, Tehachapi, CA (US)

(73) Assignee: Hybrid Plastics, Inc., Hattiesburg, MS (US)

( * ) Notice: Subject to any disclaimer, the term of this patent is extended or adjusted under 35 U.S.C. 154(b) by 321 days.

(21) Appl. No.: 11/225,607

(22) Filed: Sep. 12, 2005
(Under 37 CFR 1.47)

(65) Prior Publication Data

US 2008/0020213 A1    Jan. 24, 2008

Related U.S. Application Data

(63) Continuation-in-part of application No. 11/166,008, filed on Jun. 24, 2005, now abandoned, which is a continuation of application No. 09/631,892, filed on Aug. 4, 2000, now Pat. No. 6,972,312, application No. 11/225,607, which is a continuation of application No. 10/351,292, filed on Jan. 23, 2003, now Pat. No. 6,933, 345, which is a continuation-in-part of application No. 09/818,265, filed on Mar. 26, 2001, now Pat. No. 6,716,919, application No. 11/225,607, which is a continuation of application No. 09/747,762, filed on Dec. 21, 2000, now Pat. No. 6,911,518, and a continuation of application No. 10/186,318, filed on Jun. 27, 2002, now Pat. No. 6,927,270.

(60) Provisional application No. 60/608,582, filed on Sep. 10, 2004, provisional application No. 60/147,435, filed on Aug. 4, 1999, provisional application No. 60/351,523, filed on Jan. 23, 2002, provisional application No. 60/192,083, filed on Mar. 24, 2000, provisional application No. 60/171,888, filed on Dec. 23, 1999, provisional application No. 60/301,544, filed on Jun. 27, 2001.

(51) Int. Cl.
*C08L 83/00* (2006.01)

(52) U.S. Cl. ............... 525/101; 525/106; 525/431; 525/444; 525/464; 525/484

(58) Field of Classification Search ............ 525/101, 525/106, 431, 444, 464, 484
See application file for complete search history.

(56) References Cited

U.S. PATENT DOCUMENTS

| 2,801,968 A | 8/1957 | Furby et al. ............. 252/32.5 |
|---|---|---|
| 3,231,499 A | 1/1966 | Smith ..................... 252/57 |
| 3,247,111 A | 4/1966 | Oberright et al. ........ 252/34.7 |
| 3,267,031 A | 8/1966 | Fritz et al. .............. 252/9.8 |
| 3,278,436 A | 10/1966 | Dazzi ..................... 252/50 |
| 3,280,031 A | 10/1966 | Brennan et al. .......... 252/18 |
| 3,292,180 A | 12/1966 | Axworthy ................ 252/28 |
| 3,340,286 A | 9/1967 | Schiefer et al. .......... 260/448.2 |
| 3,347,791 A | 10/1967 | Thomson et al. ......... 252/33.5 |
| 3,673,229 A | 6/1972 | Malec |
| 4,483,107 A | 11/1984 | Tomoyori et al. ........ 51/821 R |
| 4,513,132 A | 4/1985 | Shoji et al. .............. 528/21 |
| 4,900,779 A | 2/1990 | Liebfried ................ 524/862 |
| 4,946,921 A | 8/1990 | Shirahata et al. ........ 525/477 |
| 5,047,491 A | 9/1991 | Saho et al. ............... 528/18 |
| 5,047,492 A | 9/1991 | Weidner et al. .......... 528/15 |
| 5,190,808 A | 3/1993 | Tenney et al. ............ 428/224 |
| 5,230,962 A * | 7/1993 | Stephenson ............. 428/423.1 |
| 5,384,376 A * | 1/1995 | Tunney et al. ........... 525/431 |

(Continued)

FOREIGN PATENT DOCUMENTS

| EP | 0420585 | * | 9/1990 |
|---|---|---|---|
| EP | 0624591 | | 11/2004 |

OTHER PUBLICATIONS

Search Report issued in PCT/US2005/32613 dated Aug. 8, 2007.
Chevaliaer and MacKinnon Ring-Opening Olefin Metathesis Polymerisation (ROMP) as a Potential Cross-Linking Mechanism for Siloxane Polymers Journal of Inorganic and Organometallic Polymers, vol. 9, No. 3, 1999.
International Search Report issued Jun. 19, 2008 for PCT/US07/18121.

*Primary Examiner*—Bernard Lipman
(74) *Attorney, Agent, or Firm*—David H. Jaffer; Pillsbury Winthrop Shaw Pittman LLP

(57) ABSTRACT

A method of using olefin containing nanostructured chemicals and silanol containing nanostructured chemicals as high temperature resins is described. Vinyl containing nanostructured chemicals are particularity effective in thermosets as they control the motions of polymer chains, and segments, at the molecular level. Silanol containing nanostructured chemicals are particularity effective in thermosets containing polar groups as the silanol can enhance the reactivity of these groups. Because of their tailorable compatibility with fluorinated polymers, nanostructured chemicals can be readily and selectively incorporated into polymers by direct blending and polymerization processes. The incorporation of a nanostructured chemical into a polymer favorably impacts a multitude of polymer physical properties. Properties most favorably improved are heat distortion and flammability characteristics, permeability, optical properties, texture, feel and durability. Other properties improved include time dependent mechanical and thermal properties such as creep, compression set, shrinkage, modulus, and hardness. In addition to mechanical properties, other physical properties are favorably improved, including lower thermal conductivity, and gas oxygen permeability. These improved properties may be useful in a number of applications, including composite materials, foams, cosmetics, and durable coatings.

24 Claims, 8 Drawing Sheets

U.S. PATENT DOCUMENTS

| | | | |
|---|---|---|---|
| 5,412,053 A | 5/1995 | Lichtenhan et al. | 528/9 |
| 5,484,867 A | 1/1996 | Lichtenhan et al. | 528/9 |
| 5,589,562 A | 12/1996 | Lichtenhan et al. | 528/9 |
| 5,623,030 A * | 4/1997 | Tsumura et al. | 525/478 |
| 5,730,851 A | 3/1998 | Arrowsmith et al. | |
| 5,753,374 A | 5/1998 | Camilletti | |
| 5,830,950 A | 11/1998 | Katsoulis et al. | 525/447 |
| 5,858,544 A | 1/1999 | Banaszak Holl et al. | 428/447 |
| 5,939,576 A | 8/1999 | Lichtenhan et al. | 556/460 |
| 5,942,638 A | 8/1999 | Lichtenhan et al. | 556/640 |
| 6,075,068 A | 6/2000 | Bissinger | 523/116 |
| 6,100,417 A * | 8/2000 | Lichtenhan et al. | 556/460 |
| 6,194,485 B1 | 2/2001 | Hogan et al. | |
| 6,245,849 B1 | 6/2001 | Morales et al. | 524/442 |
| 6,245,926 B1 | 6/2001 | Charrin et al. | 556/469 |
| 6,252,030 B1 | 6/2001 | Zank et al. | 528/31 |
| 6,270,561 B1 * | 8/2001 | Nguyen | 106/31.85 |
| 6,288,904 B1 | 8/2001 | Yadav et al. | 528/210 |
| 6,329,490 B1 | 12/2001 | Yamashita et al. | 528/42 |
| 6,376,769 B1 | 4/2002 | Chung | |
| 6,447,846 B2 * | 9/2002 | Nakamura et al. | 427/387 |
| 6,770,724 B1 | 8/2004 | Lichtenhan et al. | 528/14 |
| 2001/0018486 A1 * | 8/2001 | Lichtenhan et al. | 524/588 |
| 2001/0029283 A1 * | 10/2001 | Nakamura et al. | 525/100 |
| 2002/0052434 A1 | 5/2002 | Lichtenhan et al. | |
| 2004/0097663 A1 | 5/2004 | Deforth et al. | |
| 2004/0174657 A1 | 9/2004 | Andelman et al. | |
| 2005/0013990 A1 | 1/2005 | Cavallaro et al. | |
| 2006/0104855 A1 | 5/2006 | Rothschild | |

* cited by examiner

[(RSiO$_{1.5}$)n]Σn where n = 1-1,000,000

Poly POSS Oligomers

[(RSiO$_{1.5}$)$_6$]Σ$_6$     [(RSiO$_{1.5}$)$_8$]Σ$_8$     [(RSiO$_{1.5}$)$_{12}$]Σ$_{12}$

POSS Oligomer Cages

[(RSiO$_{1.5}$)$_7$(R(HO)SiO)$_1$]Σ$_8$

[(RSiO$_{1.5}$)$_4$(R(HO)SiO)$_3$]Σ$_7$

[(RSiO$_{1.5}$)$_6$(R(HO)SiO)$_2$]Σ$_8$

[(RSiO$_{1.5}$)$_4$(R(HO)SiO)$_2$]Σ$_6$

POSS Silanol Oligomer Cages

POSS Silanol Oligomer Fragments

Cyclic methylhydrido siloxane
and related silicone fluids
(Low viscocity liquid)
used as a diluent and curatuive Tris(dimethylsiloxy)PhenylSilane
and related silanes and phosphines
(Low viscocity liquid)
used as a diluent and curatuive Hexamethylene dithiol
and related thiols
used as a diluent and curatuive Elemental Sulfur
used as a curatuive Tetramethyl dithiuram
and related sulfides
used as a diluent and curatuive Phosphines and Phosphates
(Low viscocity liquid)
used as a diluent and curatuive Linear olefins
(Low viscocity liquid)
used as a diluent and curatuive Cyclic olefins
(Low viscocity liquid)
used as a diluent and curatuive

HIGH USE TEMPERATURE NANOCOMPOSITE RESINS

CROSS-REFERENCE TO RELATED APPLICATIONS

This application claims the benefit of U.S. Provisional Patent Application Ser. No. 60/608,582 filed on Sep. 10, 2004 and is a continuation-in-part of U.S. patent application Ser. No. 11/166,008 filed Jun. 24, 2005, now abandoned, which is a continuation of U.S. patent application Ser. No. 09/631,892 filed Aug. 4, 2000, now U.S. Pat. No. 6,972,312 (which claims priority from U.S. Provisional Patent Application Ser. No. 60/147,435, filed Aug. 4, 1999); this application is also a continuation of U.S. patent application Ser. No. 10/351,292, filed Jan. 23, 2003, now U. S. Pat. No. 6,933,345 (which claims priority from U.S. Provisional Patent Application Ser. No. 60/351,523, filed Jan. 23, 2002), which is a continuation-in-part of U.S. patent application Ser. No. 09/818,265, filed Mar. 26, 2001, now U.S. Pat. No. 6,716,919 (which claims priority from U.S. Provisional Patent Application Ser. No. 60/192,083, filed Mar. 24, 2000); this application is also a continuation of U.S. patent application Ser, No. 09/747,762, filed Dec. 21, 2000, now U.S. Pat. No. 6,911,518 (which claims priority from U.S. Provisional Patent Application Ser. No. 60/171,888, filed Dec. 23, 1999); and this application is also a continuation of U.S. patent application Ser. No. 10/186,318, filed Jun. 27, 2002, now U.S. Pat. No. 6,927,270 (which claims priority from U.S. Provisional Patent Application Ser. No. 60/301,544, filed Jun. 27, 2001). The disclosures of the foregoing applications are incorporated herein by reference.

FIELD OF THE INVENTION

This invention relates generally to the methods and compositions of high temperature thermoset polymers and fiber reinforced composites. More particularly, it relates to methods for the incorporation and use of nanostructured chemicals to control the cure chemistry of the polymer which in turn impacts the thermal, mechanical, and related physical properties of thermoset polymers.

This invention also relates to processing and applications of the nanoscopically controlled thermoset polymers into composite materials, coatings, adhesives, seals and molded articles. The resin and composite applications include improved composite resins, foams, fibers, paints, coatings, adhesives, and surface properties, which lead to fire resistance printability, biocompatibility, and permeability control, optical properties, and architectural coatings.

BACKGROUND OF THE INVENTION

It has long been recognized that the properties of polymers can be tailored to a high degree through variables such as polymer sequence, structure, additive and filler incorporation, composition, morphology, thermodynamic and kinetic processing control. It is similarly known that various sizes and shapes of fillers, and particulates (e.g. Teflon®, calcium carbonate, silica, carbon black etc.) can be incorporated into preformed polymers (prepolymers) or monomer mixtures to enhance physical and material properties of the resulting formulations. Prior art in thermoset polymers has also focused on property modifications through the formation of interpenetrating networks and crosslinks that is either partially or fully occur amongst the chains.

In the prior art, the desired effect has been to reduce the motion of the polymer chains and segments relative to each other. The combination of reduced chain motion combined with more rigid and the thermally stable components ultimately enhances physical properties such as dimensional stability, strength, and thermal stability. Unfortunately, all of the prior art suffers from process complexity and an inability to control the length scale in all three dimensions at the 1-50 nm level. The 1-50 nm length scale is important for polymeric materials since a typical polymer chain or crosslink has a 8 nm reptation diameter and a radius of gyration of 50 nm. This invention utilizes nanostructure chemicals to accomplish process simplification, control over cure chemistry and rate, and nanoscopic reinforcement of polymer chains down to the 1 nm level.

Furthermore, it has been calculated that as reinforcement sizes decrease below 50 nm, they will become more resistant to sedimentation and more effective at providing reinforcement to polymer systems. The full application of this theoretical knowledge, however, has been thwarted by the lack of a practical source of particulate reinforcement or reinforcements which are geometrically well defined, and monodisperse and with diameters below the 10 nm range and especially within the 1 nm to 5 nm range.

Prior art associated with thermoset polymers, interpenetrating networks, polymer morphology, and filler technology has not been able to adequately control polymer chain, coil and segmental motion and structure at the 1 nm-10 nm level. Furthermore, the mismatch of chemical potential (e.g., solubility, miscibility, etc.) between polymers and inorganic-based fillers and chemicals has traditionally resulted in a high level of heterogeneity in compounded polymers, which is akin to oil mixed with water. Therefore, there exists a need for appropriately sized chemical reinforcements, with controlled diameters (nanodimensions), distributions and with tailorable chemical functionality, to further refine the properties of polymers.

Recent developments in nanoscience have enabled the ability to cost effectively manufacture commercial quantities of materials that are best described as nanostructured chemicals due to their precise chemical formula, hybrid (inorganic-organic) chemical composition, large physical size relative to the size of traditional chemical molecules (0.3-0.5 nm), and small physical size relative to larger sized traditional fillers (>50 nm).

SUMMARY OF THE INVENTION

The present invention describes methods of preparing improved high temperature polymer thermoset resin and composite compositions by controlling their cure chemistry, structure, and properties at the nanoscopic length scale. The resulting nano-polymers are wholly useful by themselves or in combination with other polymers or in combination with macroscopic reinforcements such as foam, screen, mesh, fiber, clay, glass mineral and other fillers and other chemicals including catalysts. The nano-alloyed polymers are particularly useful for producing polymeric compositions with desirable physical properties such as adhesion to fiberous reinforcement and metal surfaces, water repellency, reduced melt viscosity, resistance to fire and oxidation.

The preferred compositions presented herein contain two primary material combinations: (1) vinyl or other olefinic R group on the POSS cage and (2) cages or partial cages bearing silanol groups (FIG. 1). These material combinations may take the form of nanostructured oligomers, or nanostructured polymers, polyhedral oligomeric silsesquioxanes, polysilsesquioxanes, polyhedral oligomeric silicates, polysilicates, polyoxometallates, carboranes, boranes, and polymorphs of carbon; or be utilized as chemical crosslinking agents or cure accelerators with nanscopic dimensions. The crosslinking agents may in turn be utilized with hydrocarbon enes, or silanes and silicones, or phosphines, or thiols or sulfur and copolymers, phenolics, novalacs, resoles, epoxy, cyanate esters, urethanes, polyimides, bismaleimides, etc., and combinations thereof.

Preferably, the method of incorporating nanostructured chemicals into such thermosets is accomplished via dissolving or blending of the nanostructured chemicals into the chemical crosslinking agents without the use of solvent. All types and techniques of blending however, including melt blending, dry blending, solution blending, reactive and non-reactive blending are effective. The terms thermoset and 'chemical crosslink' are used because chain entanglements or entanglements between a nanostructured chemical and polymer chain can behave as physical crosslinks which are similar in behavior to traditional chemical crosslinks.

Silane Rendered Thermosets

POSS nanostructured chemicals bearing R=olefin (vinyl, allyl, cyclopentene, cyclohexene, norborene etc and higher carbon groups) react with silanes to render themoset resins which show desirable thermal, mechanical, electrical and optical properties. A variety of hydride containing silanes, silicones, and silsesquioxanes can be utilized to cure these systems via the hydrosilation method (See Lichtenhan et. al. U.S. Pat. No. 5,939,576). Particularly useful are trisilanes and cyclic silanes (FIG. 2) as these aid in solubilizing the vinyl resin. Also useful but not shown in FIG. 2 are organosilanes and siloxanes. The hydrosilation reaction process involves the oxidative addition of a Si—H bond across a carbon-carbon double bond and produces no by products (FIG. 3). The reaction is catalyzed by all known hydrosilation catalysts and by free radical initiators.

Sulfur Rendered Thermosets

POSS nanostructured chemicals bearing R=olefin groups react with sulfur and thiols to also show remarkable thermal, mechanical, electrical and optical properties. A variety of sulfur containing curatives accelerants and solubilizing agents can be utilized to cure these systems via the vulcanization and thiolation method (see Lichtenhan et. al. U.S. Pat. No. 5,939,576). Particularly useful are disulfides and cyclic sulfur (FIG. 4) as these aid in solubilizing the vinyl resin. Part or all of the sulfur may be replaced by a sulfur donor such as a thiuram disulfide. The accelerator determines the rate of vulcanization, whereas the accelerator to sulfur ratio dictates the efficiency of cure and, in turn, the thermal stability of the resulting polymer. In addition an accelerator to sulfur ratio typically of 1:5 is preferred and it gives a network in which about 20 sulfur atoms for each inserted chemical crosslink. The reaction process involves the oxidative addition of a S—H or S—S bond across a carbon-carbon double bond and produces no by products (FIG. 5). The reaction is catalyzed by all known free radical, UV and thermal initiators. Especially useful is activation of the cure process by zinc oxide and stearic acid and the process is "accelerated" by the addition of small quantities of complex sulfur-based chemicals, typically sulphenamides which not only speed up the process, but also influence the properties of the resin, such as its resistance to ageing. It is not possible to list all the chemicals used as accelerators, but some of the main groups used include thiazoles, sulphenamides, and guanidines.

Phosphine Rendered Thermosets

POSS nanostructured chemicals bearing R=olefin groups react with phosphines show remarkable thermal, mechanical, electrical and optical properties. A variety of hydride containing phosphines, and phosphates can be utilized to cure these systems via the phosphorylatuion method (see Lichtenhan et. al. U.S. Pat. No. 5,939,576). Particularly useful are bis and trisphosphines and oligomeric phosphines (FIG. 6) as these aid in solubilizing the vinyl system. The reaction process involves the oxidative addition of a P—H bond across a carbon-carbon double bond and produces no by products. (FIG. 7). The reaction is catalyzed by all known by free radical initiators and UV sources.

Olefin Rendered Thermosets

POSS nanostructured chemicals bearing R=olefin groups react with enes show remarkable thermal, mechanical, electrical and optical properties. A variety of hydride containing enes, and including acetylenes can be utilized to cure these systems via the 2+2 and 4+2 addition method (also commonly known as Diels Alder). Particularly useful are linear and cyclic dienes (FIG. 8) as these aid in solubilizing the vinyl system. The reaction process involves the addition of a c-c double bond across a carbon-carbon double bond and produces no by products (FIG. 9). The reaction is catalyzed by all known by free radical initiators and UV sources.

Variations to the Thermosets

Variations to the cure methods and olefin bearing POSS nanostructured chemicals listed can similarity be utilized. For example, partial derivatization of the olefinic groups contained on the structures shown in FIG. 1 may be carried out by oxidation and substitution methods described by Lichtenhan et al in U.S. Pat. Nos. 5,942,638 and 6,100,417, and by Heck methods described by Laine et. al. The derivatization of one or more of the vinyl groups in FIG. 1 may be desirable for increasing adhesion, dissolution in base or acid conditions or for increasing or decreasing hydrophobicity and biochemical compatibility. The epoxidation of the vinyl systems in FIG. 1 is deemed particularly useful for improving adhesion.

Incorporation of POSS silanols and other reactive or non reactive POSS systems will be useful as reinforcements of olefin polymers to include bismaleimide and olefin terminated polyimides. Also the physical properties of non-olefin containing polymers such as polyimides, epoxy, urethanes can also be desirably enhanced through the incorporation of POSS silanols and other POSS systems capable of interacting with one or more polymer chains.

Silanol Epoxy and Cyanate Ester Thermosets

Silanol POSS nanostructured chemicals are capable of interacting with epoxy and cyanate ester groups through hydrogen bonding of the polar silanol with the oxygen and nitrogen groups in the epoxy and cyanate ester polymer (FIG. 10). Depending on the chemical structure of curing agents and nanoscopic entity, and curing conditions, it is possible to vary the mechanical properties ranging from extreme flexibility to high strength and hardness, and physical properties such as adhesive strength, chemical resistance, heat resistance and electrical resistance. Different chemical compositions and curing kinetics can permit the user to process over a wide range of temperatures and control the degree of crosslinking.

A significant amount of work has been reported in the literature concerning the nature of reaction between epoxides and amines. The curing kinetics of epoxy can be accelerated by many factors, such as the hydroxyl groups generated during cure, the addition of alcohols and Lewis acids. Among them, the catalytic effect of the alcohol has been widely acknowledged. The catalytic efficiency of alcohols can be approximately proportional to its acidity. This is because acids or electrophilic species accelerate the addition of most nucleophiles considerably by the reversible formation of the more reactive conjugated acids of the epoxide. A similar reaction mechanism has been proposed for Lewis acids. Our particular interest is the influence of silanol groups to the epoxy curing kinetics. A synergistic effect between silanols and Lewis acids (aluminum complexes) has also been identified.

Because of its nanoscopic size, the acidic POSS-silanol promotes additional epoxy-amine crosslinking in the post-vitrification stage, which is dominated by diffusion-control mechanisms. This can be advantageously utilized in the fabrication of fiber-reinforced composites using the resin transfer molding process, where maintaining the low viscosity for a period of time is required to eliminate porosity and to produce higher Tg materials at a lower post-cure temperature. The nanoscopic size of POSS is also useful in controlling the volume of the reactive group which increases the propensity for reaction of the secondary hydrogen atom of the epoxy-amine. This ultimately renders a more completely formed network.

A similar associative mechanism is operative in cyanate ester systems. These resin crosslink via cyclotrimerization of the OCN functions. In the presence of silanol POSS or related POSS systems (e.g. amines, siloxide anions etc), the POSS increases the volume of the reactive group and subsequently increases the propensity for more complete reaction. The silanol groups can also add across the CN triple bond of the cyanate ester groups but this secondary cure mechanism requires a higher temperature in order to reach completion.

A similar associative mechanism is operative in polyimide systems. These resins crosslink via the generation of a polyamic acid intermediate which is strongly hydrogen bonded and to which POSS can associate via hydrogen bonding. The polyamic acid is subsequently converted into cyclic imide by heating and the loss of water. In the presence of silanol POSS or related POSS systems (e.g. amines, siloxide anions etc), the POSS increases the volume of the amic-acid reactive groups and through the acidity of the silanol increases the rate of water loss and subsequently increases the propensity for more complete reaction and reduced the need for high temperature curing.

A similar associative mechanism is operative in bismaleimide systems. These resins crosslink via the reaction of diallylbisphenol A with an maleimide to form a cyclic crosslink. The POSS is able to strongly hydrogen bond to the diallylbisphenol A and increase the volume of the reactive groups and subsequently increases the propensity for more complete reaction and reduces the need for high temperature curing. A similar mechanism is also available for acetylene termated polyimided through the association of the POSS with the imide group.

A similar associative mechanism is operative in phenolic, resorcinol, and novolac systems. These resins crosslink via the reaction of phenols to form a methylene crosslinked network through the loss of water. The POSS is able to strongly hydrogen bond to the phenol and increase the volume of the reactive groups and subsequently increases the propensity for more complete reaction and reduces the need for high temperature curing.

A similar associative mechanism is operative in polyurethane systems. These resins crosslink via the condensation and addition reaction of an alcohol or amine with an isocyanate to form a urethane crosslink. The POSS is able to strongly hydrogen bond to the alcohol and isocyanate and increase the volume of the reactive groups and subsequently increases the propensity for more complete reaction and reduces the need for high temperature curing.

DEFINITION OF FORMULA REPRESENTATIONS FOR NANOSTRUCTURES

Figure 1:
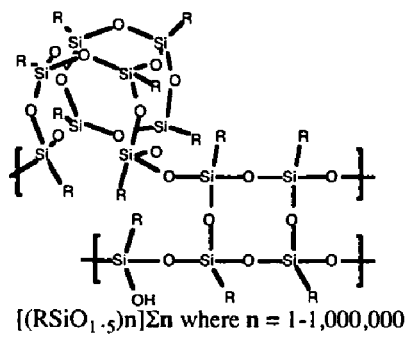
FIG. 1 illustrates some representative examples of polyvinyl containing nanostructured chemicals (lower vinyl functionality are also included).
Figure 1:
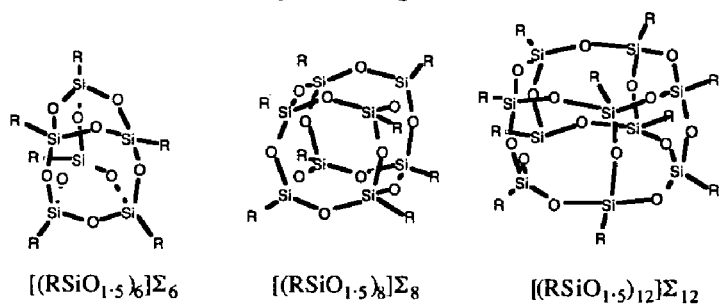
Figure 1:
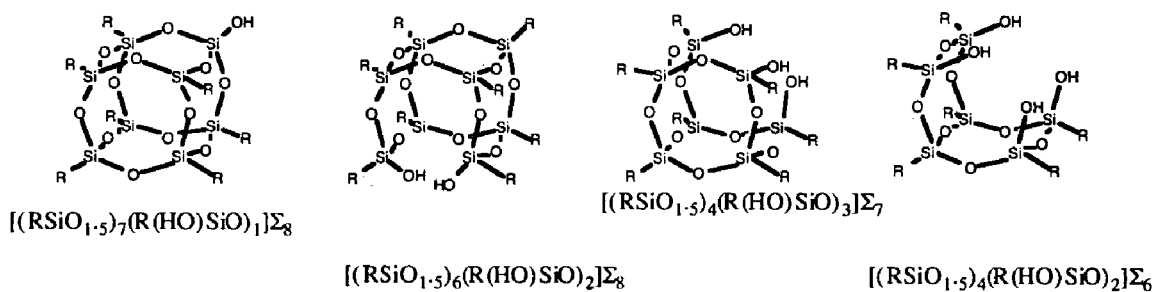
Figure 1:
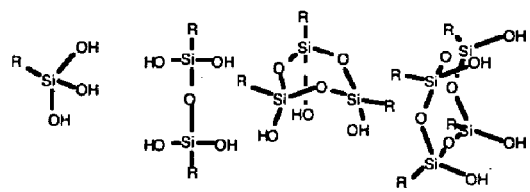
Figure 2:
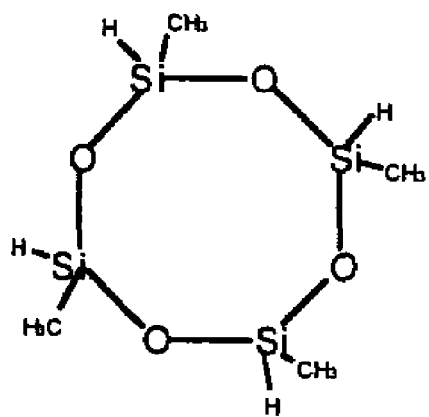
FIG. 2 illustrates some different silanes useful in forming thermosets via the hydrosilation reaction.
Figure 2:
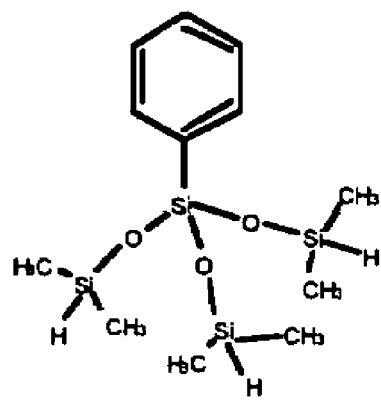
Figure 3:
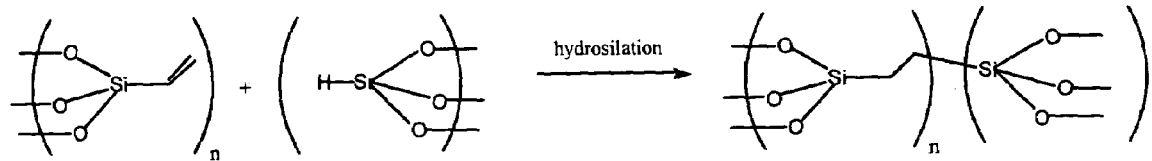
FIG. 3 illustrates the hydrosilation process.
Figure 4:
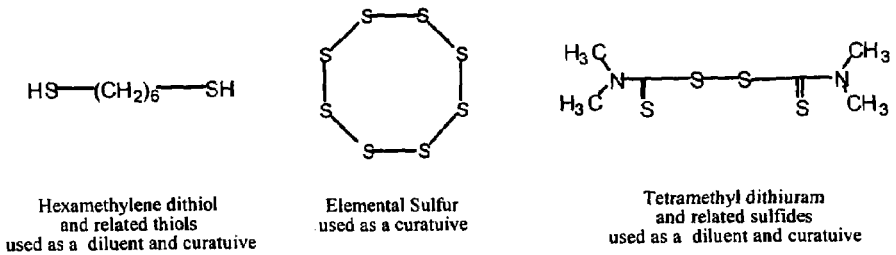
FIG. 4 illustrates some different sulfur curatives useful in forming thermosets.
Figure 5:
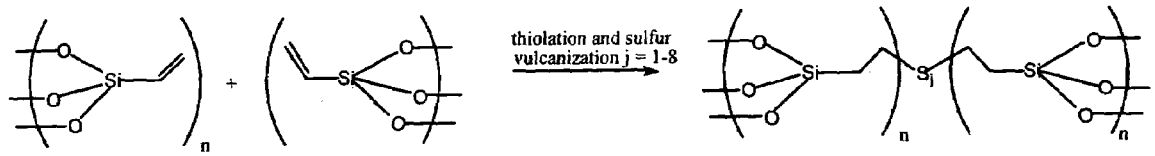
FIG. 5 illustrates an aspect of the sulfur cure process.
Figure 6:
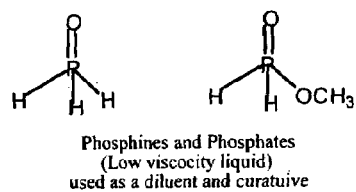
FIG. 6 illustrates some different phosphorylation curatives.
Figure 7:
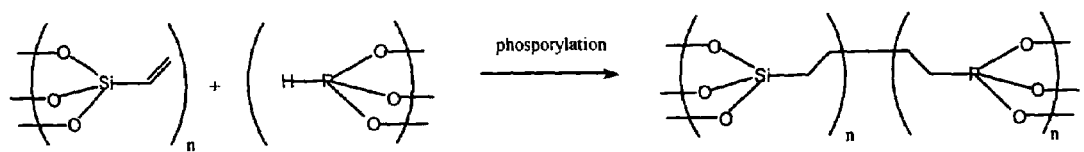
FIG. 7 the phosphorylation process.
Figure 8:
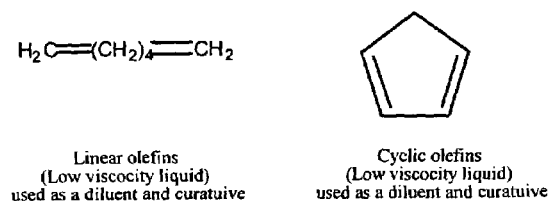
FIG. 8 illustrates some different ene curatives.
Figure 9:
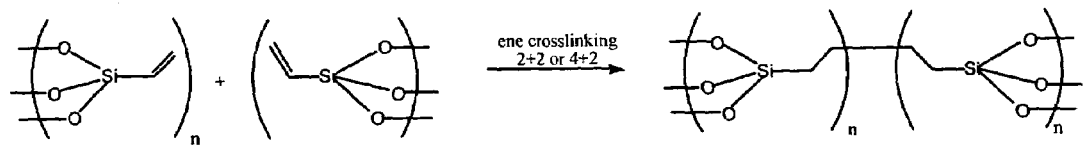
FIG. 9 illustrates a 2+2 ene curing process.
Figure 10:
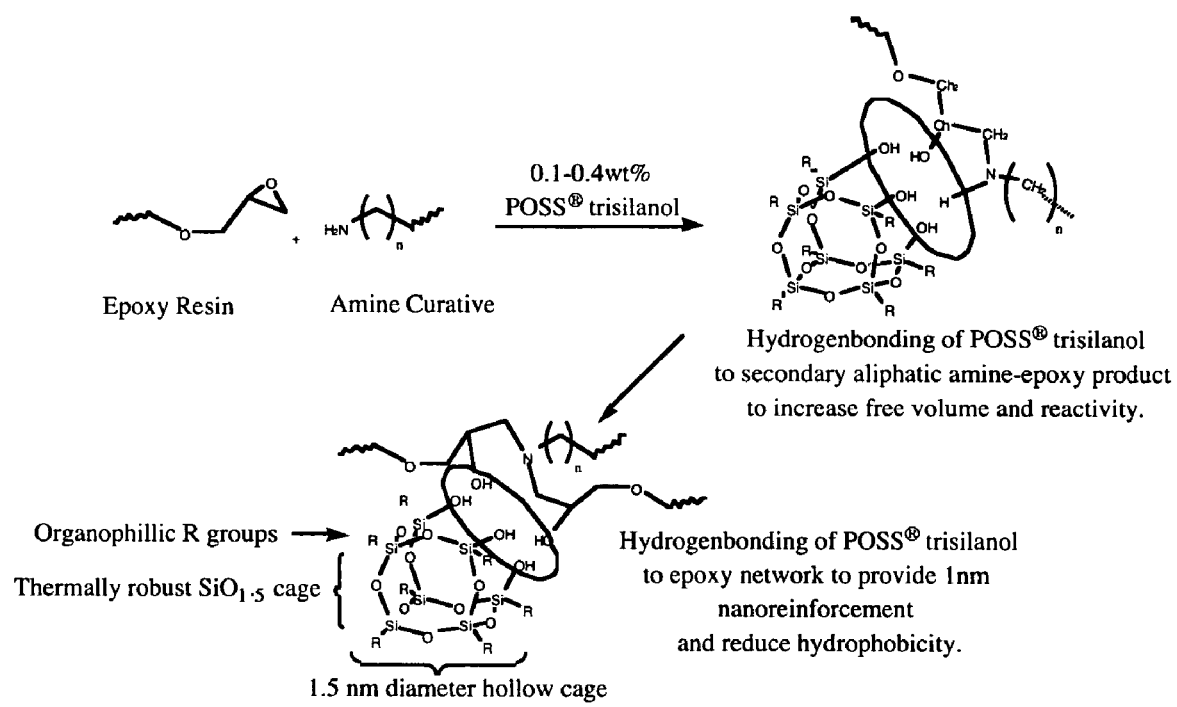
FIG. 10 illustrates crosslinked network formation through association of silanol with reactive epoxy groups. Similar mechanism for imide and cyante ester, and urethane polymers.

For the purposes of understanding this invention's chemical compositions the following definition for formula representations of Polyhedral Oligomeric Silsesquioxane (POSS) and Polyhedral Oligomeric Silicate (POS) nanostructures is made.

Polysilsesquioxanes are materials represented by the formula $[RSiO_{1.5}]_x$ where x represents molar degree of polymerization and R=represents organic substituent (H, siloxy, cyclic or linear aliphatic or aromatic groups that may additionally contain reactive functionalities such as alcohols, esters, amines, ketones, olefins, ethers or halides or which may contain fluorinated groups). Polysilsesquioxanes may be either homoleptic or heteroleptic. Homoleptic systems contain only one type of R group while heteroleptic systems contain more than one type of R group.

POSS and POS nanostructure compositions are represented by the formula:

$[(RSiO_{1.5})_n]_{\Sigma\#}$ for homoleptic compositions $[(RSiO_{1.5})_n(R'SiO_{1.5})_m]_{\Sigma\#}$ for heteroleptic compositions (where R≠R')

$[(RSiO_{1.5})_n(RXSiO_{1.0})_m]_{\Sigma\#}$ for functionalized heteroleptic compositions (where R groups can be equivalent or inequivalent)

In all of the above R is the same as defined above and X includes but is not limited to OH, Cl, Br, I, alkoxide (OR), acetate (OOCR), peroxide (OOR), amine ($NR_2$) isocyanate (NCO), and R. The symbols m and n refer to the stoichiometry of the composition. The symbol Σ indicates that the composition forms a nanostructure and the symbol # refers to the number of silicon atoms contained within the nanostructure. The value for # is usually the sum of m+n, where n ranges typically from 1 to 24 and m ranges typically from 1 to 12. It should be noted that Σ# is not to be confused as a multiplier for determining stoichiometry, as it merely describes the overall nanostructural characteristics of the system (aka cage size).

DETAILED DESCRIPTION OF THE INVENTION

The present invention teaches the use of nanostructured chemicals as building blocks for the reinforcement of polymer coils, domains, chains, and segments at the molecular level in thermoset resins.

The keys that enable nanostructured chemicals to function as molecular level reinforcing and alloying agents are: (1) their unique size with respect to polymer chain dimensions, and (2) their ability to be compatibilized with polymer systems to overcome repulsive forces that promote incompatibility and expulsion of the nanoreinforcing agent by the polymer chains. That is, nanostructured chemicals can be tailored to exhibit preferential affinity/compatibility with some polymer microstructures through variation of the R groups on each nanostructure. At the same time, the nanostructured chemicals can be tailored to be incompatible with other microstructures within the same polymer, thus allowing for selective reinforcement of specific polymer microstructure. Therefore, the factors to effect a selective nanoreinforcement include specific nanosizes of nanostructured chemicals, distributions of nanosizes, and compatibilities and disparities between the nanostructured chemical and the polymer system.

Nanostructured chemicals, such as the monoscopic sized POSS structures illustrated in FIG. 1, are available as both solids and oils. Both forms dissolve in solvents, or coreagents thus solving the long-standing dispersion problem associated with traditional particulate fillers or the mixing complexities associated with interpenetrating networks. Moreover, because POSS nanocages dissolve into plastics at the molecular level, the forces (i.e., free energy) from solvation/mixing are sufficient to prevent POSS from coalescing and forming agglomerated domains as occurs with traditional and other organofunctionalized fillers. Agglomeration of particulate fillers has been a problem that has traditionally plagued formulators and molders.

A relative comparison between the size of POSS cages relative to polymer dimensions and filler diameters/length scales is as follows: Amorphous Segments 0.5-5 nm, Octacyclohexyl POSS 1.5 nm, Random Polymer Coils 5-10 nm, Particulate Silica 9-80 nm, Crystalline Lamellae 1.0-9,000 nm, Fillers/Organoclays 2-100,000 nm. The size of POSS is roughly equivalent to that of most polymer dimensions, thus at a molecular level POSS can effectively alter the motion of polymer chains.

The ability of POSS to control chain motion is particularly apparent when POSS is incorporated into a polymer chain or network. See U.S. Pat. No. 5,412,053 to Lichtenhan et al., U.S. Pat. No. 5,484,867 to Lichtenhan et al, U.S. Pat. No. 5,589,562 to Lichtenhan et al. and U.S. Pat. No. 5,047,492 to Weidner, all expressly incorporated by reference herein. When POSS nanostructures are covalently linked to the polymer chain they act to retard chain motion and greatly enhance time dependent properties such as $T_g$, HDT, Creep and Set, which correlate to increased modulus, hardness, and abrasion resistance. The present invention now shows that similar property enhancements can be realized by the incorporation of nanostructured chemicals into thermosets. This greatly simplifies the prior art processes.

Furthermore, because POSS nanostructured chemicals possess spherical shapes (per single crystal X-ray diffraction studies), like molecular spheres, and because they dissolve, they are also effective at reducing the viscosity of polymer systems. This benefit is similar to what is produced through the incorporation of plasticizers into polymers, yet with the added benefits of reinforcement of the individual polymer chains due to the nanoscopic nature of the chemicals. Thus ease of processability and reinforcement effects are obtainable through the use of nanostructured chemicals (e.g. POSS, POS) where as prior art would have required the use of both process aids and fillers or and an illdefined mixture of polymer chains. Additional benefit may be realized by the usage of nanostructured chemicals with monodisperse cage sizes (i.e., polydispersity=1) or from polydisperse cage sizes. Such control over compatibility, dispersability, and size is unprecedented for all traditional filler, plasticizer, and interpenetrating network technologies.

EXAMPLES

General Process Variables Applicable to all Processes

As is typical with chemical processes there are a number of variables that can be used to control the purity, selectivity, rate and mechanism of any process. Variables influencing the process for the incorporation of nanostructured chemicals (e.g. POSS/POS etc.) into plastics include the size and polydispersity, and composition of the nanostructured chemical. Similarly the molecular weight, polydispersity and composition of the polymer system must also be matched with that of the nanostructured chemical. Finally, the kinetics, thermodynamics, and processing aids used during the mixing process, and accelerants and cocuratives used during the crosslinking process are also tools of the trade that can impact the loading level and degree of enhancement resulting from incorporation of nanostructured chemicals into polymers. Blending processes such as melt blending, dry blending and solution mixing blending are all effective at mixing and alloying nanostructured chemical into plastics.

Alternate Method: Solvent Assisted Formulation. POSS can be added to a vessel containing the desired polymer, prepolymer, or monomers and dissolved in a sufficient amount of an organic solvent (e.g. hexane, toluene, dichlormethane, etc.) or fluorinated solvent to effect the formation of one homogeneous phase. The mixture is then stirred under high shear at sufficient temperature to ensure adequate mixing for 30 minutes and the volatile solvent is then removed and recovered under vacuum or using a similar type of process including distillation. Note that supercritical fluids such as $CO_2$ can also be utilized as a replacement for the flammable hydrocarbon solvents. The resulting formulation may then be used directly or for subsequent processing.

Example 1

Silane Cure Vinyl POSS Resin

Example 1a

A 70 g sample of vinyl POSS cage/resin mixture as stirred into 30 g of phenyltrisdimethlysiloxy silane. The mixture was heated to 60° C. to promote dissolution and then allowed to cure to room temperature. Then 3 ppm of a hydrosilation catalyst was stirred into the mixture. The resin was then cast and allowed to react at room temperature for 8 hours and subsequently heated to 60° C. for 4 hours and at 120° C. for 2 hours. An optically clear resin plaque was removed and found to have outstanding thermal and mechanical properties.

Example 1b

Silane Cure of Viny POSS and Epoxy POSS Resin/Cage Mixture

A similar procedure to 1a was carried out using a resin consisting of a 85% vinyl POSS and 5% epoxy POSS. This was cured in a similar manner to 1a and was found to have nearly identical mechanical and thermal properties with improved adhesion to wood and polar surfaces including composite fibers. (Note that a range of vinyl and epoxy from 0.1 to 99.9% was found to be acceptable.) An additionally desirable feature of this resin is its optical clarity.

Example 1c

Silane Cure of Vinyl POSS and Epoxy POSS Resin/Cage Mixture

A similar procedure to 1a was carried out using a resin consisting of a 80% vinyl POSS and 20% phenyl POSS. This was cured in a similar manner to 1a and was found to have improved fire resistance. (Note that a 0.1 to 99.9% relative range of vinyl and pehnyl was found to be acceptable. Optical clarity for this formulation was also found to be a desirable property.

Also tertiary mixtures of vinyl, phenyl, and epoxy were found to be favorable). For example the following range of vinyl POSS and phenyl POSS systems were determined to be of utility.

| Final Composition | ViSi(OMe)$_3$ (mole %) | PhSi(OMe)$_3$ (mole %) | EpCyEtSi(OMe)$_3$ (mole %) |
|---|---|---|---|
| PM1285-0502 | 80 | 20 | 0 |
| PM1285-0502 | 75 | 20 | 5 |
| PM1285-0508 | 70 | 20 | 10 |
| PM1285-0509 | 65 | 20 | 15 |
| PM1285-0510 | 60 | 20 | 20 |

Synthesis of PM1285-0510 Vinyl POSS Derivatives:

ViSi(OMe)$_3$ (184.72 g, 1.246 mole), PhSi(OMe)$_3$ (82.37 g, 0.415 mole) and EpCyEtSi(OMe)$_3$ (102.19 g, 0,415 mole) were dissolve in MEK (1.5 L) and methanol (205 mol) in a 3 L 3-neck round bottom flask fitted with mechanical starrier and reflux condenser. To this reaction mixture KOH [0.6 g, dissolve in water (149.5 mol)] was added slowly with stirring. The reaction mixture was heated to reflux and continued for 30 h. After the reaction HCl was added and stir for 30 min. Then 1.5 kg ice/water and 400 mol hexane was added and stir for 30 min. Hexane/MEK layer was separated and solvent was removed in the rotavapor to afford solid PM1285 derivatives.

Example 2

Sulfur Cure

A vinyl POSS cage/resin mixture (5.01 g), Sulfur (0.0516 g), Captax (0.025 g), Butyl zimate (0.0255 g) and Methyl tuads (0.0254 g) were mechanically mixed at room temperature. The mixture then cured at 110° C. for 24 and to produced an optically clear resin plaque which was found to have thermal and mechanical properties similar to those of epoxy resins.

Example 3

Ene Cure

A 50 g sample of vinyl POSS cage/resin mixture thoroughly mixed with cumene peroxide and the mixture was heated to 100° C. to promote crosslinking. An optically clear resin plaque was found to have outstanding thermal properties. Tailorability of the thermal and mechanical properties of the resin resulting from the ene method were found possible through the addition of cyclopentadiene, cyclopentadiene resin, hexadiene, norbornadiene as co-ene monomer reagents.

Example 4

Epoxidation of Vinyl POSS Cage/Resin Mixture

A 50 g sample of vinyl POSS cage/resin mixture was stirred into peracetic acid (200 ml) chloroform (500 ml), sodium bicarbonate (62.1 g) and sodium acetate (1.1 g) mixture and refluxed. After 2 hours the reaction was stopped by cooling. At room temperature water (700 ml) was added and the mixture stirred and filtered and was allowed to phase separate into an aqueous layer and organic layer. The organic layer was separated and treated with methanol (100 ml) to yield a white solid of epoxidized product. Note that MCPBA (metachloroperbenzoic acid) is also an acceptable oxidizing agent in place of the peracetic acid.

Example 5a

POSS Silanol and Epoxy Cure

Two conventional epoxy monomers and a conventional amine curative were used to demonstrate the effectiveness of this approach. Diglycidyl ether of Bisphenol A, DGEBA (D.E.R.w 332, Dow Chemical, equivalent epoxide [E] weight: 173), and tetraglycidyl diamino diphenyl methane, TGDDM (Aldrich Chemicals, equivalent [E] weight: 105.6) were mixed with stirring and then 2-methyl-1,5-pentadiamine (Dytek A, DuPont Chemicals, equivalent hydrogen [H] weight: 29) or a diamine terminated polypropylene oxide (JeffaminewD230, Huntsman Chemicals, equivalent [H] weight: 57.5) was added. The epoxy (E) to amine (H) ratio used was stoichiometric, [E]/[H] ¼ 1. To this resin mixture was added phenyltrisilanol POSS (POSS-triol) in ranges from 0.1 to 1 weight percentage. The resin was then heated and stirred at 50° C. for 30 min and then degassed in vacuum for 10 min at room temperature. The resin was poured in a mold and cured in a mechanical convection air oven set at a specified temperature for 12 h. Compositions, thermomechanical, and processing parameters are given below.

| POSS Silanol SO1458 | Epoxy | Amine | Cure Temp (° C.) | Cure Time (h) | Tg (° C.) | E' @ 30° C. (GPa) | E' @ Plateau (MPa) |
|---|---|---|---|---|---|---|---|
| 0 | DGEBA | Jeffamine ® | 100 | 12 | 84 | 3.7 | 30 |
| 0.4 | DGEBA | Jeffamine ® | 100 | 12 | 91 | 3.3 | 32 |
| 0 | TGDDM | Jeffamine ® | 150 | 12 | 137 | 4.3 | 80 |
| 0.4 | TGDDM | Jeffamine ® | 150 | 12 | 148 | 3.6 | 76 |
| 0 | DGEBA | Dytek ® A | 100 | 12 | 98 | 2.6 | 29 |
| 0.2 | DGEBA | Dytek ® A | 100 | 12 | 115 | 2.6 | 36 |
| 0.6 | TGDDM | Dytek ® A | 100 | 12 | 118 | 2.3 | 38 |
| 0.8 | TGDDM | Dytek ® A | 100 | 12 | 122 | 2.0 | 36 |
| 0 | TGDDM | Dytek ® A | 150 | 12 | 167 | 2.6 | 78 |
| 0.2 | TGDDM | Dytek ® A | 150 | 12 | 214 | 2.5 | 97 |
| 0.6 | TGDDM | Dytek ® A | 150 | 12 | 219 | 2.8 | 125 |
| 0 | TGDDM | Dytek ® A | 100 | 24 | 198 | 2.5 | 126 |
| 0.4 | TGDDM | Dytek ® A | 100 | 24 | 207 | 3.0 | 144 |
| 1.0 | TGDDM | Dytek ® A | 100 | 24 | 222 | 2.5 | 172 |

Jeffamine ® Huntsman Chemicals, Dytek ® A DuPont

Example 5b

POSS Epoxy Cure with Anyhydrides

The procedure of 5a is also applicable to conventional epoxy and anhydride cured systems. For example, a three part epoxide was formulated using a 45:55, weight ratio of a Part A POSS epoxide, a Part B anhydride. To this mixture was added a 3 wt % imidazole catalyst and the system was thoroughly mixed at room temperature. The resin was suitable for molding or infusion. Cure was carried out at 70° C. for 120 minutes as was followed by curing the molded part to room temperature before removal from the mold. The POSS epoxy had the following desirable properties: density 1.1-1.2 g/ml, Glass Transition 110-120° C., Viscosity (after mixing) ~10 Poise, Shelf Life 12 months at 24° C., Tensile Modulus 2.2 Gpa.

Example 6

POSS Silanol and Polyimide Cure

Figure 11:
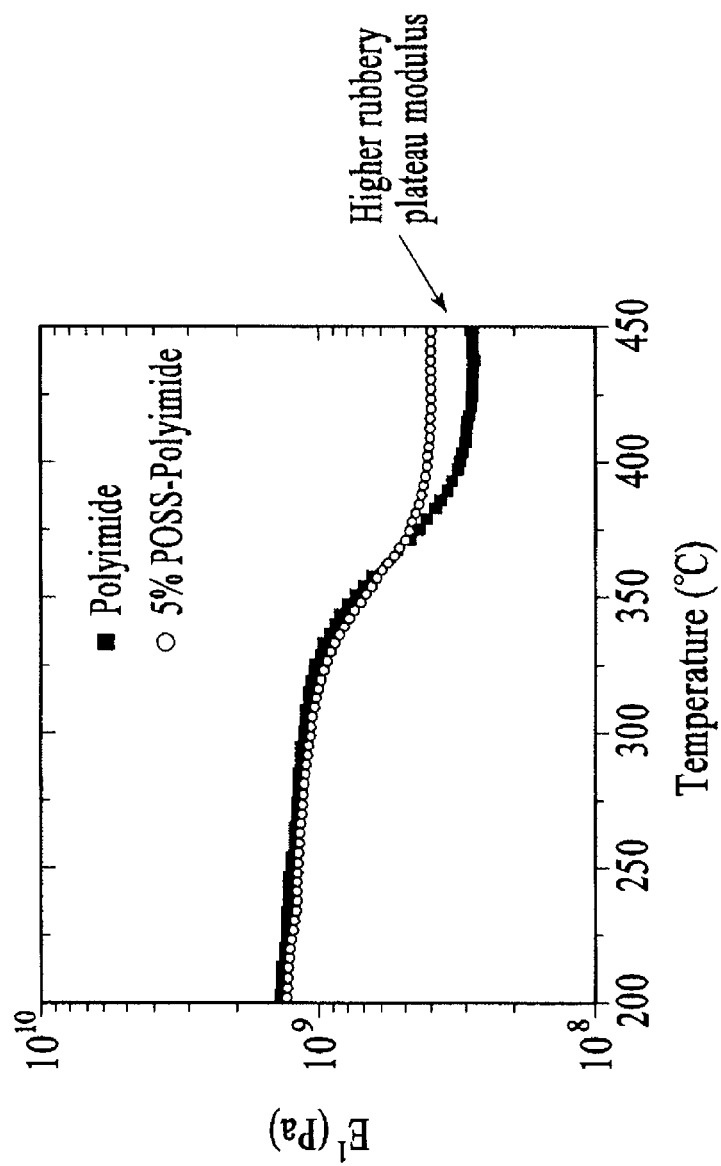
FIG. 11 shows increased modulus (E') for 5% POSS-polyimide at elevated temperature.

Commercial polyamic acid (Dupont) utilized for the formation of kapton® film was utilized to demonstrate the effectiveness of this approach. POSS silanol is dissolved into a solution of polyamic acid in NMP solvent. The soluble range of POSS in this mixture is from 0.1-60 wt % with a preferred range from 5-15 wt %. The solution of poly (amic acid) and POSS® in NMP can then be cast into films or coatings and subsequently imidized at 100° C. for 2 hours, then 200° C. for 2 hours and 300° hour. The incorporation of POSS results in excellent optical properties, increase modulus (E') at elevated temperature (see FIG. 11), increased toughness (elongation× tensile) and greatly improved resistance to oxidation through the formation of a protective silica glass upon the film surface upon exposure to oxygen plasma or other oxidizing agents.

Typical mechanical properties for 5% POSS ® polyimide at room temperature.

| Material | Youngs Modulus (KSI) | Tensile Strength (KSI) | Elongation | Tg (°C.) |
|---|---|---|---|---|
| Polyimide | 346 | 9.0 | 5% | 385 °C. |
| 5% POSS-polyimide | 350 | 10.8 | 7% | 385 °C. |

Example 7

POSS Silanol and Bismaleimide (BMI) Cure

Commercial BMI resins were used to demonstrate the effectiveness of this approach. POSS silanols were added to a stoichiometic formulation of BMPM/DABPA (BMPM=bismaleimide monomer/polymer and DABPA=diallylbisphenol A) produced by Cytec under product code 5250-4. The range of POSS silanols can be from 0.1 wt % to 50 wt % with a preferred range from 1-10 wt %. The DABPA was first heated to 100° C., and then POSS silanols were dissolved prior to the addition of the BMPA. All mixtures of BMI POSS silanol were optically clear which indicated the full dispersion of the POSS silanol. Note that other variations for BMPM can be utilized such as dimethyl ether modified DABPA (me-DABPA) following the same procedure. The resulting mixture was then cured by heating 1 hr @ 177° C., 1 hr @ 200° C., 6 hr @ 250° C. The following desirable properties of the formulation were observed: elimination of the need for 300° C. cure step, viscosity at 100° C.=3 cps, shelf-life=12 months, heat distortion=689° F., flexural strength @ 23° C.=15,000 psi, elongation @ 23° C.=4-5%, modulus @ 23° C.=5.5×10$^5$ psi (flexural), flexural strength @ 275° F.=9000 psi, elongation @ 275° F.=7-8%, modulus @ 275° F.=5.5×10$^5$ psi (flexural).

Figure 12:
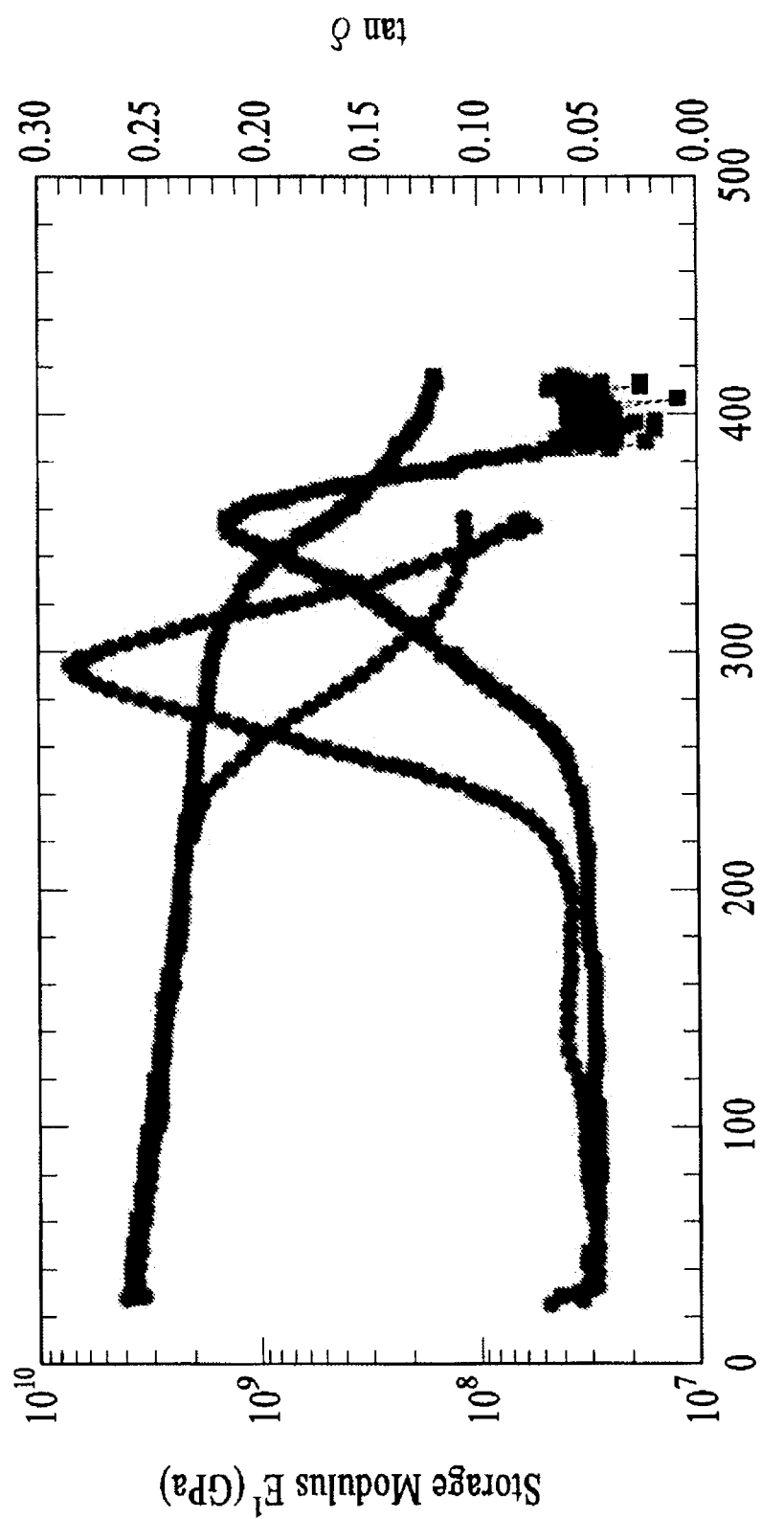
FIG. 12 shows the improved modulus and lass transition for POSS-enhanced bismaleimide resins discussed in Example 7.

Dynamic mechanical analysis of the 0.8% enhanced POSS silanol BMI resin relative to the BMI control reveals a 60° improvement in the glass transition temperature and retainment of modulus (E') at elevated temperature relative to the BMI control. Moreover, the presence of POSS does not affect the kinetics of initial "low-temperature" (177° C.) cycle. Consequently the processibility of system is retained. Note that while it is possible for BMI alone to achieve a $T_g$ of 350° C., this also requires an additional 2 hours of post-curing at 300° C. In contrast the POSS BMI affords a $T_g$ of 365° C. using a lower temperature, faster, and simplified cure cycle (1 hr at 177° C., 2 hrs at 200° C., and 6 hrs at 250° C.). Furthermore, the fact that modulus of the POSS-BMI is not significantly degraded at 400° C. provides a major enablement for high temperature composites. See FIG. 12.

To evaluate the composite characteristics of the POSS BMI, four plies of 6" by 6" T650-35 carbon-fabric composite panels were fabricated using commercial grade Cytec 5250-4 resin reinforced with 5 weight percent POSS PMI. The interfacial adhesion, of a POSS-BMI relative to a BMI control was evaluated by conducting a short beam shear test. Five samples were tested and an average shear strength value for the 5250-4 BMI control of 58.44 MPA±2.68 verses 59.14±2.00 for the 5% POSS BMI was observed.

Example 8

POSS Silanol and Telechelic Polyimide Cure

The synthesis of telechelic polyimide resins (PMR) involves dissolving dialkylester, diamine and monoalkylester (end-capper) in a low boiling alkyl alcohol (i.e., methanol). To this mixture is added POSS silanol in various wt percentages from 0.1-50 wt % with a preferred loading range from 1-15 wt %. Because the POSS silanols and PMR are soluble in the alcohol the resulting viscosity solution can be used to impregnate fibers or fabric to provide a prepreg. The prepreg, upon removal of the solvent, contains a homogeneous mixture of the PMR and POSS reactants. When heated to temperatures between 150° C. to 200° C., the PMR undergoes an in-situ condensation reaction to form end-capped imide oligomers. Depending on the reaction conditions (temperature/pressure) of end-capper used, the final cure (thermosetting) is usually performed at temperatures between 315° C. (600° F.; nadic ester, NE) to 371° C. (700° F.; phenylethynylphthalic acid, methyl ester, PEPE). Commercial PMR resins were utilized to confirm the value of POSS in this system. To a HFPE-II-52 PMR resin, a NASA second generation resin) was added POSS silanols such as trisilanol phenyl POSS and trisilanol ethyl POSS.

Figure 13:
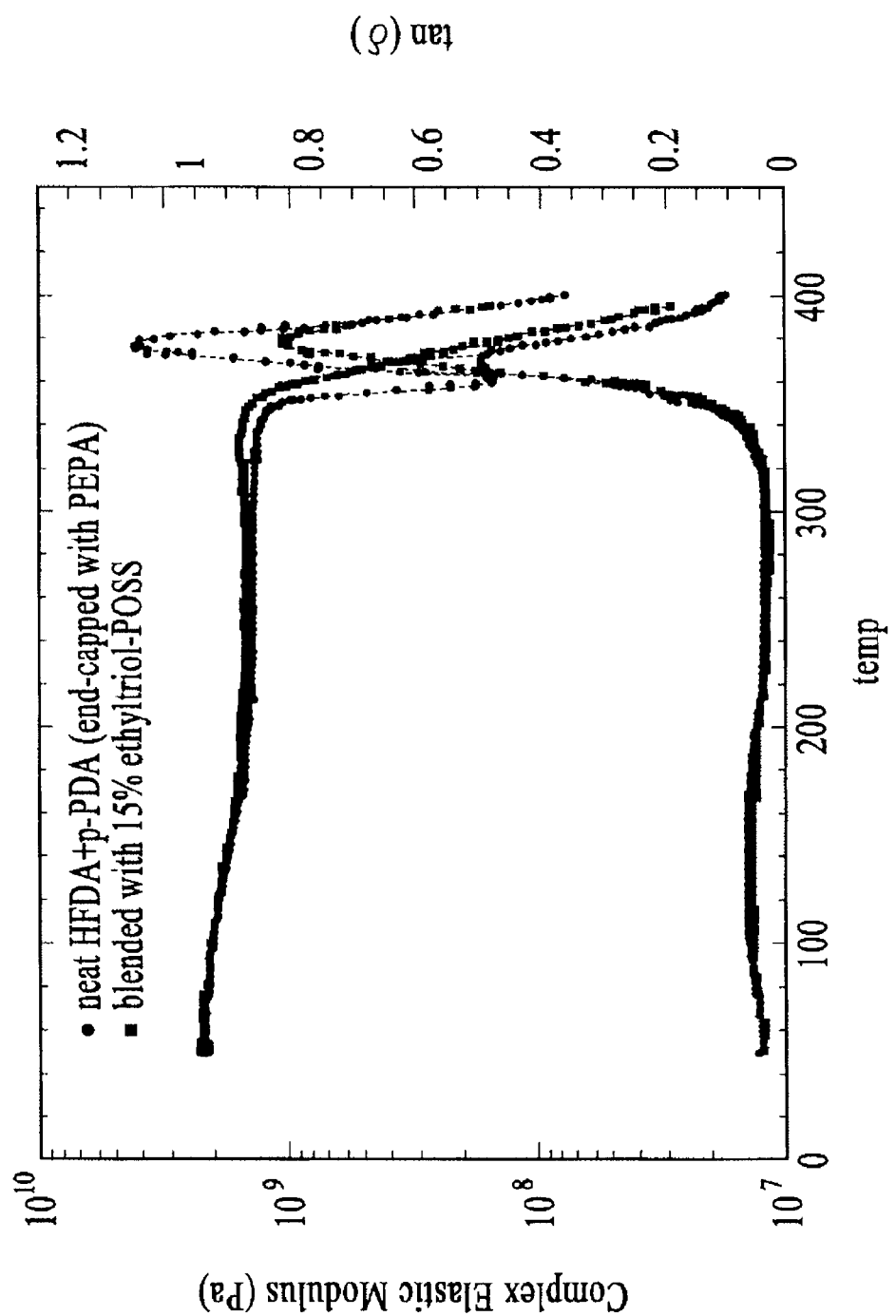
FIG. 13 shows the increase in retainment of modulus at elevated temperature for POSS-telechelic polvimide resins discussed in Example 8.

Upon curing an optically clear resin resulted. A plot of the elastic modulus for the PMR control and the POSS PMR reveals an increase in retainment of modulus at elevated temperature for the P0SS PMR system. See FIG. 13.

To demonstrate this desirable properties of the POSS PMR resin relative to the PMR resin in composites, 8 plies of (90/0) T650-35 carbon-fabric composite panels made with HFPE-II-52 PMR and POSS HFPE-II PMR. Composite panels containing 7 wt % and 15 wt % of Ethyl Triol and Phenyl triol in HFPE-II-52 CFC show excellent processibility as compared to non-POSS containing resin. In addition, the density of POSS triol is less than HFPE PMR which leads to POSS-containing composite to have a lower density which is a benefit in obtaining "light weight" composite structures.

| Materials Type | Fiber Content (Wt %) | Density (gm/cc) | Void Content (Vol %) |
|---|---|---|---|
| HFPE-II-52 | 64.1 | 1.626 | 0.32 |
| +15% Phenyl POSS Triols | 64.9 | 1.618 | 0.37 |

Furthermore, the composite samples were exposed to thermal aging, and their mechanical properties were evaluated using three-point bending tests. Testing at 315° C. (600° F.), showed an average of 10% improvement in the flexural strength for composites made with 15 wt % additions of trisilanol ethyl POSS and a 15% improvement in the flexural strength for composites made with 15 wt % additions of trisilanol phenyl POSS.

| Sample (~60 vol % T650-35 Carbon Fabrics) | Flexural Strength* (Ksi) | Flexural Modulus* (Msi) |
|---|---|---|
| HFPE-II-52 (Control) | 94.9 ± 6 | 7.8 ± 0.13 |
| with 7% POSS-Phenyl Triol | 100.7 ± 3 | 8.3 ± 0.14 |
| with 7% POSS-Ethyl Triol | 95.7 ± 8 | 8.5 ± 0.16 |
| with 15% POSS-Phenyl Triol | 108.2 ± 5 | 8.6 ± 0.14 |

Although the present invention has been described above in terms of a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A method of compounding a nanostructured chemical into a thermoset polymer, comprising the step of mixing (a) POSS nanostructured chemical having an attached olefinic group, (b) a polymer resin selected from the group consisting of olefins, phenolics, novolacs, resoles, epoxies, cyanate esters, urethanes, polyrnides, and bismaleimides, and (c) a curative selected from the group consisting of silanes, sulfur, sulfur compounds, phosphines, and enes.

2. The method of claim 1, wherein a plurality of POSS nanostructured chemicals having an attached olefinic group are compounded into the polymer.

3. The method of claim 1, wherein the thermoset mixture is in a physical state selected from the group consisting of oils, amorphous, semicrystalline, crystalline, elastomeric, rubber, and crosslinked materials.

4. The method of claim 1, wherein the polymer contains a chemical sequence and related polymer microstructure.

5. The method of claim 1, wherein the polymer is a polymer coil, a polymer domain, a polymer chain, a polymer segment, or mixtures thereof.

6. The method of claim 1, wherein the nanostructured chemical reinforces the thermoset at a molecular level.

7. The method of claim 1, wherein the compounding is nonreactive.

8. The method of claim 1, wherein the compounding is reactive.

9. The method of claim 1, wherein a physical property of the thermoset polymer is improved as a result of compounding the nanostructured chemical into the polymer.

10. The method of claim 9, wherein the physical property comprises a member selected from the group consisting of adhesion to a polymeric surface, adhesion to a composite surface, adhesion to a metal surface, water repellency, density, low dielectric constant, thermal conductivity, glass transition, viscosity, melt transition, storage modulus, relaxation, stress transfer, abrasion resistance, fire resistance, biological compatibility, gas permeability, and porosity.

11. The method of claim 1, using a silane curative.

12. The method of claim 1, using a sulfur or sulfur compound curative.

13. The method of claim 1, using a phosphorus curative.

14. The method of claim 1, using an ene curative.

15. The method of claim 1, wherein the POSS nanostructured chemical functions as a plasticizer.

16. The method of claim 1, wherein the POSS nanostructured chemical functions as a filler.

17. The method of claim 1, wherein the POSS nanostructured chemical functions as a plasticizer and as a filler.

18. The method of claim 1, wherein the POSS nanostructured chemical is selectively compounded into the polymer such that the POSS nanostructured chemical is incorporated into a predetermined region within the polymer.

19. The method of claim 1, wherein compounding a POSS nanostructured chemical into the polymer serves to control molecular motion of the polymer.

20. The method of claim 18, wherein a time dependent property is enhanced as a result of compounding the POSS nanostructured chemical into the polymer.

21. The method of claim 20, wherein the time dependent property is selected from the group consisting of $T_g$, HDT, modulus, creep, set, permeability, errosion resistance, and abrasion resistance.

22. The method of claim 17, wherein the POSS nanostructured chemical is selected to have chemical properties compatible with a selected region of the polymer, thereby reinforcing the selected region of the polymer.

23. The method of claim 1, wherein the olefinic group is selected from the group consisting of vinyls, allyls, cyclopentenes, cyclohexenes, and norborenes.

24. The method of claim 23, wherein the olefinic group is an epoxy modified vinyl.

* * * * *

UNITED STATES PATENT AND TRADEMARK OFFICE
CERTIFICATE OF CORRECTION

| | |
|---|---|
| PATENT NO. | : 7,553,904 B2 |
| APPLICATION NO. | : 11/225607 |
| DATED | : June 30, 2009 |
| INVENTOR(S) | : Joseph D. Lichtenhan et al. |

It is certified that error appears in the above-identified patent and that said Letters Patent is hereby corrected as shown below:

Add the following heading and paragraph at column 1, after line 31:

--STATEMENT OF GOVERNMENT RIGHTS--

--This invention was made in the performance of a Cooperative Research and Development Agreement with the Department of the Air Force. The Government of the United States has certain rights to use the invention.--

Signed and Sealed this

Sixth Day of October, 2009

David J. Kappos
*Director of the United States Patent and Trademark Office*